United States Patent
Jang et al.

(10) Patent No.: US 10,297,809 B2
(45) Date of Patent: May 21, 2019

(54) SECONDARY BATTERY

(71) Applicant: SAMSUNG SDI CO., LTD., Yongin-si, Gyeonggi-do (KR)

(72) Inventors: Myung-Jae Jang, Yongin-si (KR); Hyun-Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 861 days.

(21) Appl. No.: 14/550,787

(22) Filed: Nov. 21, 2014

(65) Prior Publication Data

US 2015/0228958 A1 Aug. 13, 2015

(30) Foreign Application Priority Data

Feb. 7, 2014 (KR) .......................... 10-2014-0014445

(51) Int. Cl.
*H01M 2/26* (2006.01)
*H01M 2/02* (2006.01)
*H01M 4/64* (2006.01)
*H01M 2/20* (2006.01)

(52) U.S. Cl.
CPC ......... *H01M 2/263* (2013.01); *H01M 2/0202* (2013.01); *H01M 2/024* (2013.01); *H01M 2/0217* (2013.01); *H01M 2/0237* (2013.01); *H01M 2/20* (2013.01); *H01M 2220/20* (2013.01); *H01M 2220/30* (2013.01)

(58) Field of Classification Search
CPC ........ H01M 2/263; H01M 2/20; H01M 2/024; H01M 2/0217; H01M 2/0202; H01M 2/0237; H01M 2220/30; H01M 2220/20
See application file for complete search history.

(56) References Cited

U.S. PATENT DOCUMENTS

| 2002/0045093 | A1  | 4/2002 | Imamura et al. |
| 2012/0058374 | A1* | 3/2012 | Aota ................. B23K 35/365 429/94 |
| 2012/0164501 | A1* | 6/2012 | Guen .................... H01M 2/263 429/94 |

(Continued)

FOREIGN PATENT DOCUMENTS

| KR | 2002-0029322    | 4/2002 |
| KR | 10-2013-0004041 | 1/2013 |
| KR | 10-2013-0040577 | 4/2013 |

*Primary Examiner* — Lisa S Park
(74) *Attorney, Agent, or Firm* — Lewis Roca Rothgerber Christie LLP

(57) ABSTRACT

A secondary battery includes: a case having an opening; an electrode assembly in the case; a cap plate for sealing the opening of the case; and an electrode unit penetrating through the cap plate, and electrically coupled to the electrode assembly. The electrode unit includes: a current collector coupled to the electrode assembly; and a lead coupled to the current collector and penetrating through the cap plate. The current collector and the lead are coupled to each other by inserting an assembling portion of the lead into an accommodation opening formed in the current collector. Thus, a structure of a coupling portion of the electrode unit for forming charging/discharging paths coupled to the electrode assembly may be improved, and accordingly, an effective internal volume of a case in which the electrode assembly is accommodated and a battery capacity of the electrode assembly may be increased.

19 Claims, 6 Drawing Sheets

(56) References Cited

U.S. PATENT DOCUMENTS

| | | | |
|---|---|---|---|
| 2012/0171555 A1* | 7/2012 | Heo | H01M 2/266 |
| | | | 429/161 |
| 2012/0276442 A1* | 11/2012 | Kim | H01M 2/0473 |
| | | | 429/179 |
| 2013/0004833 A1 | 1/2013 | Kim | |
| 2013/0095374 A1 | 4/2013 | Kim | |

* cited by examiner

SECONDARY BATTERY

CROSS-REFERENCE TO RELATED APPLICATION

This application claims priority to and the benefit of Korean Patent Application No. 10-2014-0014445, filed on Feb. 7, 2014, in the Korean Intellectual Property Office, the disclosure of which is incorporated herein in its entirety by reference.

BACKGROUND

1. Field

One or more embodiments of the present invention relate to a secondary battery.

2. Description of the Related Art

Unlike a primary battery which is not designed to be rechargeable, a secondary battery is generally rechargeable and dischargeable. The secondary battery is used as an energy source of a mobile device, an electric vehicle, a hybrid vehicle, an electric bicycle, an uninterruptible power supply, etc., and according to the type of an external device using the secondary battery, the secondary battery may be used in the form of a single battery or in the form of a battery module obtained by connecting a plurality of secondary batteries in one unit.

SUMMARY

One or more embodiments of the present invention include a secondary battery having an increased battery capacity by improving a structure of a coupling portion in an electrode unit forming charging and discharging paths that are coupled to an electrode assembly.

Additional aspects will be set forth in part in the description which follows and, in part, will be apparent from the description, or may be learned by practice of the presented embodiments.

According to one or more embodiments of the present invention, a secondary battery includes: a case having an opening; an electrode assembly in the case; a cap plate configured to seal the opening of the case; and an electrode unit penetrating through the cap plate, and electrically coupled to the electrode assembly, wherein the electrode unit includes: a current collector coupled to the electrode assembly; and a lead coupled to the current collector and penetrating through the cap plate, wherein the current collector and the lead are coupled to each other by inserting an assembling portion of the lead into an accommodation opening in the current collector.

The assembling portion may be inserted from a lower direction of the accommodation opening.

A welding curve may be formed along a boundary between the assembling portion and the accommodation opening.

The lead may further include a base expanding from the assembling portion to be stepped to a lower direction, and the base of the lead may be located under a periphery of the accommodation opening to overlap with the periphery.

The base may contact the periphery of the accommodation opening in a state where the assembling portion is inserted in the accommodation opening.

The assembling portion of the lead and the accommodation opening of the current collector may have shapes matched with each other.

The assembling portion of the lead and the accommodation opening of the current collector may have circular shapes.

A circular welding curve may be formed along a boundary between the assembling portion of the lead and the accommodation opening of the current collector.

The lead may include: a base; the assembling portion protruding upward from the base; and a column portion protruding upward from the assembling portion so as to penetrate through the cap plate, wherein the current collector may include: a current collecting portion coupled to the electrode assembly; and an accommodation portion extending from the current collecting portion to define the accommodation opening.

The base, the assembling portion, and the column portion may form stepped portions with respect to each other so that a width of the lead decreases toward an upper portion.

The base of the lead and the accommodation portion of the current collector may overlap with each other.

The base may include a boundary formed along a periphery of the assembling portion, and a protruding piece extending from the boundary toward the accommodation portion.

The accommodation portion of the current collector may include an annular boundary for defining the accommodation opening.

The accommodation portion and the current collecting portion of the current collector may extend in different directions from each other, may be coupled to each other, and may be bent from each other.

According to one or more embodiments of the present invention, a secondary battery includes: a case having an opening; an electrode assembly in the case; a cap plate configured to seal the opening of the case; and an electrode unit penetrating through the cap plate and electrically coupled to the electrode assembly, wherein the electrode unit may include: a current collector coupled to the electrode assembly; and a lead coupled to the current collector and penetrating through the cap plate, wherein the lead is inserted in the current collector to be assembled, and a welding curve is formed along a boundary between the current collector and the lead.

The lead may include a base and an assembling portion protruding upward from the base, and the assembling portion of the lead may be fitted into an accommodation opening of the current collector.

The assembling portion and the accommodation opening may have shapes that are matched with each other.

The welding curve may be formed along a circular curve through which the assembling portion and the accommodation opening are in contact with each other.

The base may be located under a periphery of the accommodation opening to overlap with the periphery.

The current collector may include: an accommodation portion for defining the accommodation opening; and a current collecting portion extending from the accommodation portion to be coupled to the electrode assembly, wherein the accommodation portion and the current collecting portion may extend in different directions from each other and may be coupled to each other and be bent from each other, and the base may include a boundary formed along a periphery of the assembling portion and a protruding piece extending from the boundary to overlap with the accommodation portion.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
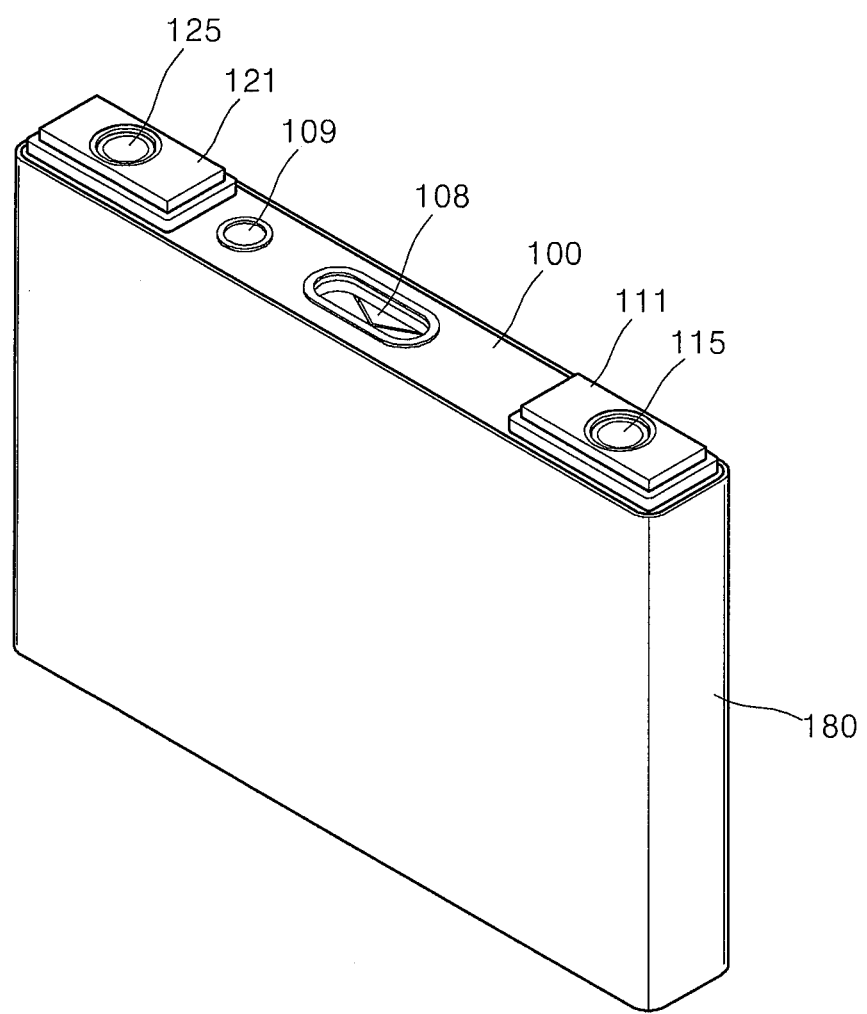
FIG. 1 is a perspective view of a secondary battery according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 2:
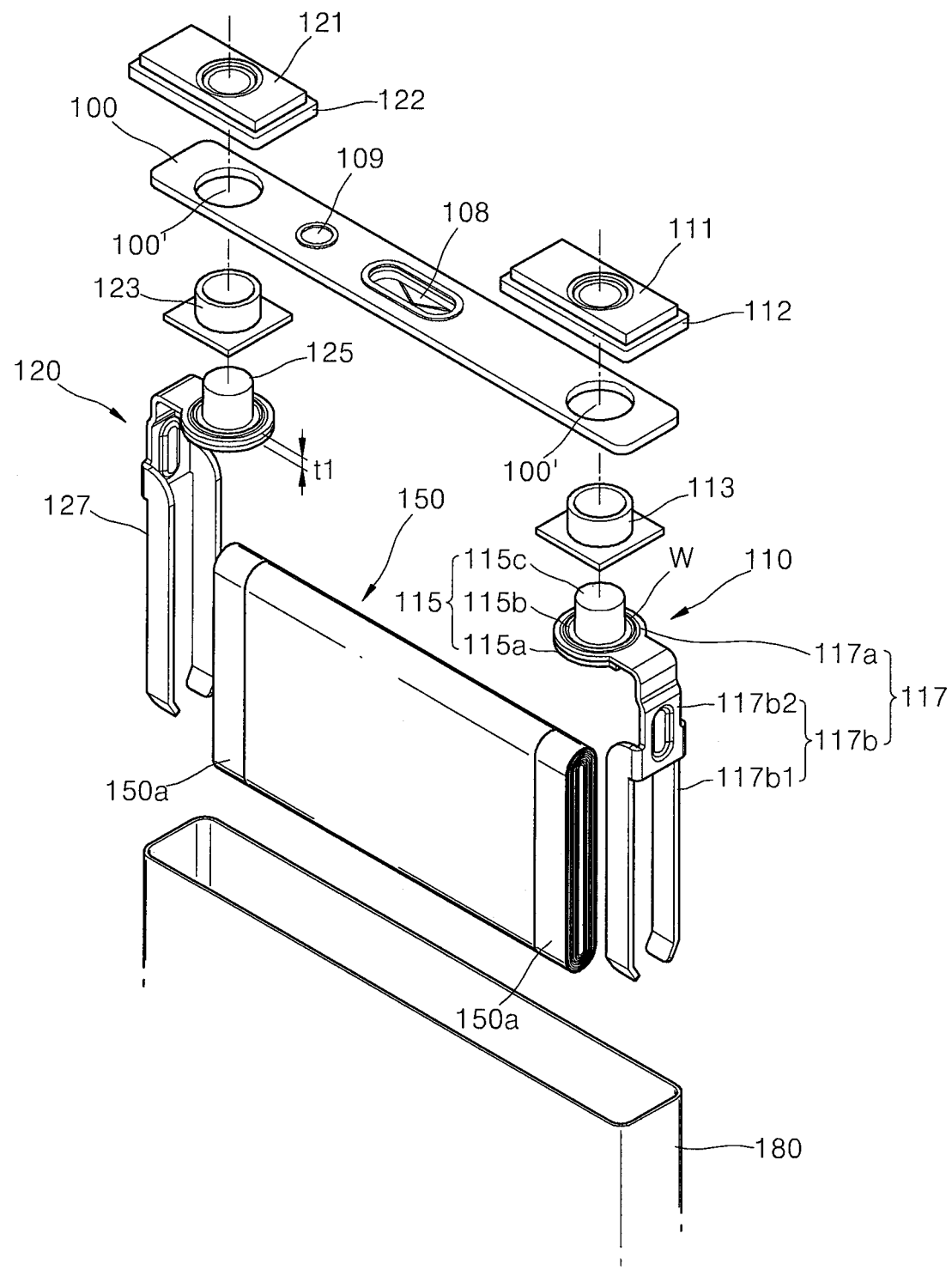
FIG. 2 is an exploded perspective view of the secondary battery of FIG. 1.

FIG. 1 is a perspective view of a secondary battery according to an embodiment of the present invention, and FIG. 2 is an exploded perspective view of the secondary battery of FIG. 1.

Referring to FIGS. 1 and 2, the secondary battery may include a pair of first and second electrode terminals 111 and 121 that are formed to protrude from the secondary battery. For example, the first and second electrode terminals 111 and 121 are electrically coupled to an electrode assembly 150 (e.g., see FIG. 2) that is accommodated in a case 180, and the first and second electrode terminals 111 and 121 may act respectively as a positive terminal and a negative terminal electrically coupled to first and second electrode plates of the electrode assembly 150 to supply a discharging power accumulated in the electrode assembly 150 to outside or to supply a charging power to the electrode assembly 150 from outside. For example, the first and second electrode terminals 111 and 121 may be formed on left and right sides of the secondary battery.

According to another embodiment of the present invention, a cap plate 100 of the secondary battery may be electrically coupled to the electrode assembly 150 to perform as a terminal. In other embodiments, one of the first and second electrode terminals 111 and 121 may be omitted.

Referring to FIG. 2, the secondary battery includes the electrode assembly 150, the first and second electrode terminals 111 and 121, and first and second electrode units 110 and 120 that provide electrical connection between the electrode assembly 150 and the first and second electrode terminals 111 and 121. In addition, the secondary battery may include the case 180 accommodating the electrode assembly 150, and the cap plate 100 for sealing an opening of the case 180, in which the electrode assembly 150 is accommodated. The cap plate 100 is coupled to an upper end of the case 180, in which the electrode assembly 150 is accommodated, to seal the opening of the case 180. For example, the cap plate 100 and the case 180 may be welded with each other along edges (e.g., around periphery) of the cap plate 100.

The cap plate 100 may include a safety vent 108 that is broken when an internal pressure in the case 180 exceeds a set level (e.g., a predetermined level) to release the internal pressure, and an electrolyte injection hole sealing 109 for sealing an electrolyte injection hole.

The electrode assembly 150 may be accommodated in the case 180 of the secondary battery, and may include a first electrode plate and a second electrode plate having opposite polarities and a separator interposed between the first and second electrode plates. The electrode assembly 150 may be formed as a roll type in which the first and second electrodes and the separator are rolled in a jelly-roll shape, or as a stack type in which the first and second electrodes and the separator are alternately stacked.

The cap plate 100 is coupled onto the opening of the case 180, in which the electrode assembly 150 is accommodated, to seal the electrode assembly 150, and the first and second electrode terminals 111 and 121 electrically coupled to the electrode assembly 150 may be formed on an outside of the cap plate 100 for an electric connection between the electrode assembly 150 and an external circuit (not shown) or between the electrode assembly 150 and a neighboring secondary battery. The first and second terminals 111 and 121 may have different polarities from each other, and may be respectively coupled to the first and second electrode plates of the electrode assembly 150.

The first and second electrode units 110 and 120 may be assembled with the cap plate 100. The electrode units 110 and 120 may be assembled to penetrate through the cap plate 100, and may electrically couple the electrode assembly 150 positioned under the cap plate 100 to the first and second electrode terminals 111 and 121 located on the cap plate 100. For example, the first and second electrode units 110 and 120 may constitute an electrical path extending from the electrode assembly 150 so as to supply discharging power accumulated in the electrode assembly 150 to the outside, or may constitute an electrical path coupled to the electrode assembly 150 so as to receive recharging power from the outside. The first and second electrode units 110 and 120 may have different polarities from each other.

The first and second electrode units 110 and 120 may respectively constitute negative and positive electrodes of the secondary battery. The first and second electrode units 110 and 120 may be formed to have substantially the same structure. The technical specifications of the first and second electrode units 110 and 120 that will be described below may be applied to the first and second electrode units 110 and 120 in common. However, the present invention is not limited thereto, and the following technical specifications may be only applied to one of the first and second electrode units 110 and 120.

The structure of the first electrode unit 110 will be described below first, and then the second electrode unit 120 will be described.

Figure 3:
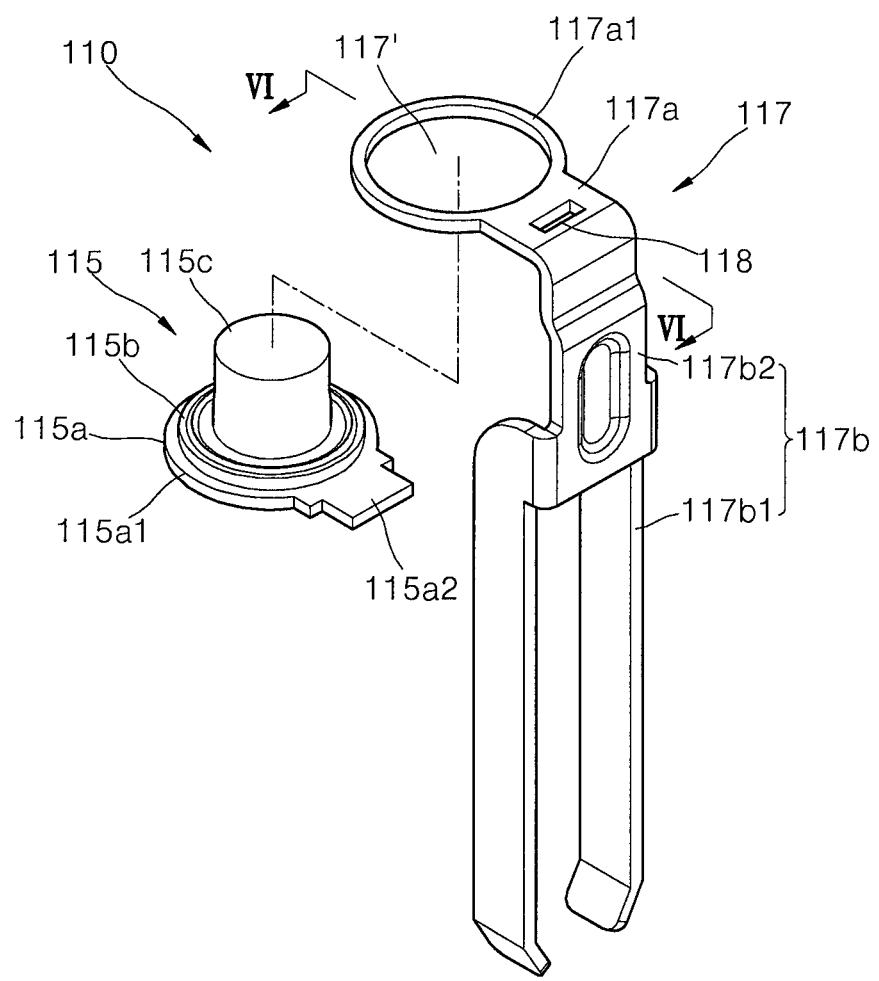
FIG. 3 is an exploded perspective view of a first electrode unit of FIG. 2.

FIG. 3 is an exploded perspective view of the first electrode unit 110 in FIG. 2. Referring to FIGS. 2 and 3, the first electrode unit 110 may include a lead member (i.e., a lead) 115 assembled to the cap plate 100 so as to penetrate through the cap plate 100, and a current collecting member (i.e., a current collector) 117 extending from the lead member 115 to the electrode assembly 150.

The current collecting member 117 may include a current collecting portion 117b coupled to the electrode assembly 150, and an accommodation portion 117a coupled to the lead member 115. For example, the current collecting portion 117b and the accommodation portion 117a may extend in different directions bent from each other. In addition, the accommodation portion 117a may be arranged to face the lead member 115 in order to be coupled to the lead member 115. The current collecting portion 117b and the accommodation portion 117a may be integrally formed with each other, and may be coupled to each other and be bent from each other.

The current collecting portion 117b is electrically coupled to the electrode assembly 150. For example, the current collecting portion 117b may be coupled to non-coated portions 150a formed at opposite ends of the electrode assembly 150 by a welding process. For example, the current collecting portion 117b may include a first portion 117b1 that is branched to two members facing each other so as to be inserted on opposite outer surfaces of the non-coated portion 150a. In particular, the current collecting portion 117b may include the first portion 171b1 arranged to face a main surface of the electrode assembly 150 to be inserted into the electrode assembly 150, and a second portion 117b2 extending from the first portion 117b1 to face a side surface of the electrode assembly 150. The first and second portions 117b1 and 117b2 are arranged to respectively face the main surface and the side surface of the electrode assembly 150. To do this, the first and second portions 117b1 and 117b2 may be coupled to each other and be bent with respect to each other.

The accommodation portion 117a may include an accommodation hole (or an accommodation opening) 117' for coupling to the lead member 115. The accommodation hole 117' may be formed to have a shape that matches with an outer circumferential surface of the lead member 115 so as to surround an outer circumference of the lead member 115. For example, the lead member 115 may be inserted in the accommodation hole 117' to be assembled, and may be coupled to the accommodation hole 117' by a welding operation performed along a boundary between the lead member 115 and the accommodation hole 117'. For example, the accommodation hole 117' may be formed to have a circular shape surrounding the outer circumference of the lead member 115, and the accommodation portion 117a may include an annular boundary 117a1 formed along a periphery of the accommodation hole 117'.

In addition, the current collecting member 117 may constitute an electrical path for discharging charges accumulated in the electrode assembly 150 to outside as a discharging current or for inputting a charging current supplied to the electrode assembly 150 from outside. A fuse portion 118 for blocking charging and discharging currents exceeding a preset point (e.g., current range or current limit) during charging and discharging processes may be formed in the current collecting member 117.

The lead member 115 is inserted into the accommodation hole 117' of the current collecting member 117 to be assembled, and is electrically coupled to the electrode assembly 150 when being coupled to the current collecting member 117. For example, the lead member 115 may include a base 115a, an assembling portion 115b protruding from the base 115a, and a column portion 115c protruding from the assembling portion 115b and assembled to penetrate through the cap plate 100.

The base 115a may be formed as a flat plate. The base 115a may be arranged to overlap with the accommodation portion 117a of the current collecting member 117, and may support the accommodation portion 117a to reinforce a strength of the accommodation portion 117a. For example, the base 115a may include a boundary 115a1 formed along a periphery of the assembling portion 115b, and a protruding piece 115a2 extending from the boundary 115a1 toward the accommodation portion 117a. For example, the accommodation portion 117a may be formed as a thin plate for saving an upper space in the case 180. As such, the accommodation portion 117a may be structurally vulnerable, and the accommodation portion 117a may be arranged to overlap with the base 115a (for example, the protruding piece 115a2 of the base 115a) so as to reinforce the strength of the accommodation portion 117a.

In addition, the base 115a may align a coupling location of the lead member 115. For example, the lead member 115 may be coupled to the current collecting member 117 from a lower portion of the current collecting member 117, and the coupling location of the lead member 115 may be defined at a location where the base 115a of the lead member 115 contacts a bottom surface of the accommodation portion 117a. Here, the assembling portion 115b of the lead member 115 may be assembled in the accommodation hole 117' of the current collecting member 117, and a welding operation may be performed along a periphery of the accommodation hole 117' (a welding line W, see FIG. 2).

The assembling portion 115b may be inserted to the accommodation hole 117' of the current collecting member 117. That is, the assembling portion 115b may be assembled after being inserted in the accommodation hole 117' of the current collecting member 117, and may be formed to have a shape that matches with the accommodation hole 117'. For example, the assembling portion 115b may be formed as a cylinder having a circular cross-section. In addition, the accommodation hole 117', to which the assembling portion 115b is inserted, of the current collecting member 117 may be formed to have a circular shape.

Since the assembling portion 115b and the accommodation hole 117' of the current collecting member 117 are formed to have circular shapes matched with each other, the welding operation may be performed along a line (or a curve) in which the assembling portion 115b and the accommodation hole 117' contact each other. That is, the welding line W (see FIG. 2) may be formed along a boundary of a circumference in which the assembling portion 115b and the accommodation hole 117' contact each other. The welding line (or the welding curve) W may be formed through a laser welding process; however, one or more embodiments of the present invention are not limited thereto, that is, the welding line W may be formed through various welding processes such as an ultrasonic wave welding operation or a resistance welding operation. For example, an upper surface of the assembling portion 115b and an upper surface of the periphery surrounding the accommodation hole 117' (an upper surface of the accommodation portion 117a) may roughly constitute a flat surface, and the welding process may be performed along a circular curve or circle where the assembling portion 115b and the accommodation hole 117' contact each other.

Figure 4:
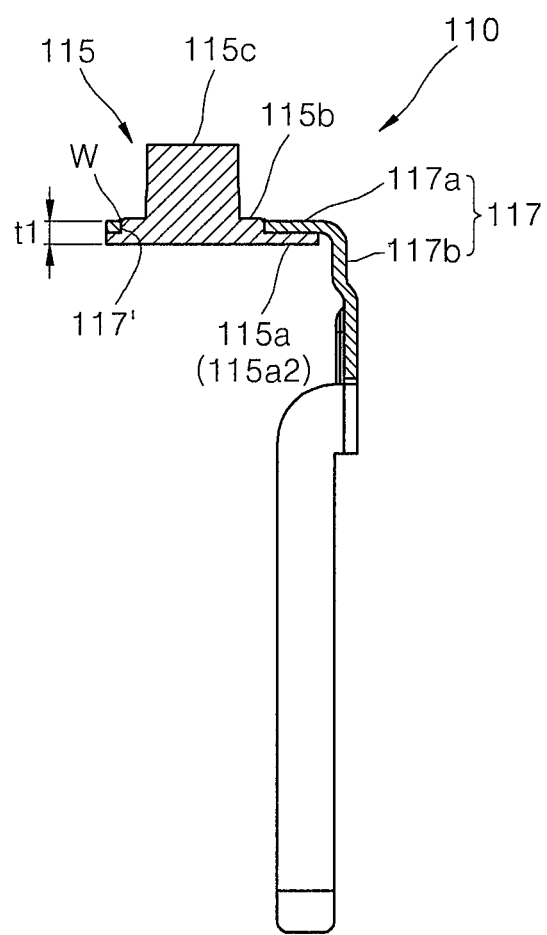
FIG. 4 is a cross-sectional view of the first electrode unit taken along the line IV-IV of FIG. 3.

Referring to FIG. 4, the assembling portion 115b protrudes from the base 115a, and the assembling portion 115b and the base 115a form a stepped portion in a thickness direction thereof. The base 115a is a portion having the smallest thickness among the portions of the entire lead member 115. When the base 115a that is thin and the current collecting member 117 (in particular, the accommodation portion 117a) are arranged to overlap with each other, a thickness t1 of the coupling portion, including thickness of the lead member 115 and thickness of the current collecting member 117, may be reduced. For example, since the assembling portion 115b is inserted into the accommodation hole 117' of the current collecting member 117, the thickness t1 of the coupling portion of the lead member 115 and the current collecting member 117 does not increase. Instead, since the base 115a that is thin overlaps with the current collecting member 117, increase in the thickness t1 may be reduced or minimized.

Referring to FIGS. 2 and 3, the column portion 115c protrudes upward from the assembling portion 115b, and penetrates through the cap plate 100 to be coupled to the electrode terminal 111 located on the cap plate 100. The column portion 115c is exposed to outside after penetrating through a terminal hole (or a terminal opening) 100' of the cap plate 100. In addition, the column portion 115c exposed to outside is coupled to the electrode terminal 111. For example, the column portion 115c and the electrode terminal 111 may be coupled to each other through a riveting or a caulking process, that is, an end of the column portion 115c that is exposed through the cap plate 100 and the terminal hole 100' of the electrode terminal 111 is pressurized by a shaping tool (not shown) such as a hammer so that the end of the column portion 115c is compressed around the terminal hole 100' of the electrode terminal 111. For example, a shaping tool (not shown) rotating at high speed may be applied to the end of the exposed column portion 115c so that a part of the column portion 115c is spread out around the terminal hole 100' of the electrode terminal to be adhered to the periphery of the electrode hole 100', and then, the column portion 115c and the electrode terminal 111 may be coupled to each other.

Referring to FIG. 2, insulating members (i.e., insulators) 112 and 122 may be located respectively between the cap plate 100 and the first and second electrode terminals 111 and 121. For example, the cap plate 100 and the first and second electrode terminals 111 and 121 may have different polarities from each other, and thus, the insulating members 112 and 122 are located between the cap plate 100 and the first and second electrode terminals 111 and 121 for performing electrical insulation therebetween.

Insulating gaskets 113 and 123 may be located respectively between the cap plate 100 and lead members (i.e., leads) 115 and 125. The insulating gaskets 113 and 123 seal the periphery of the electrode hole 100' of the cap plate 100 through which the lead member 115 or 125 penetrates so as to seal and protect the electrode assembly 150 or an electrolyte (not shown) accommodated in the case 180 against external impurities.

The insulating gaskets 113 and 123 surround the lead members 115 and 125 penetrating through the terminal hole 100', and may insulate the lead members 115 and 125 from the cap plate 100. For example, the insulating gaskets 113 and 123 may extend under the cap plate 100 toward a bottom surface of the cap plate 100. For example, the insulating gaskets 113 and 123 may insulate the first and second electrode units 110 and 120 from the cap plate 100 at the bottom surface of the cap plate 100.

Each of the insulating gaskets 113 and 123 may be formed as a single body assembled through the terminal hole 100' of the cap plate 100, or may be divided into two or more pieces along an extension direction of the terminal hole 100' to be assembled with each other from upper and lower portions of the terminal hole 100'.

Figure 5:
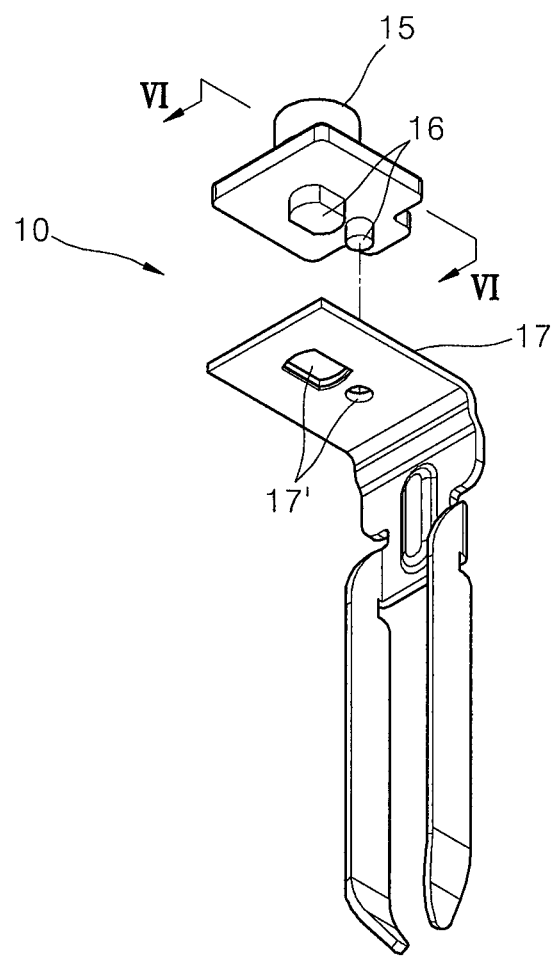
FIG. 5 is an exploded perspective view of an electrode unit according to a comparative example.
Figure 6:
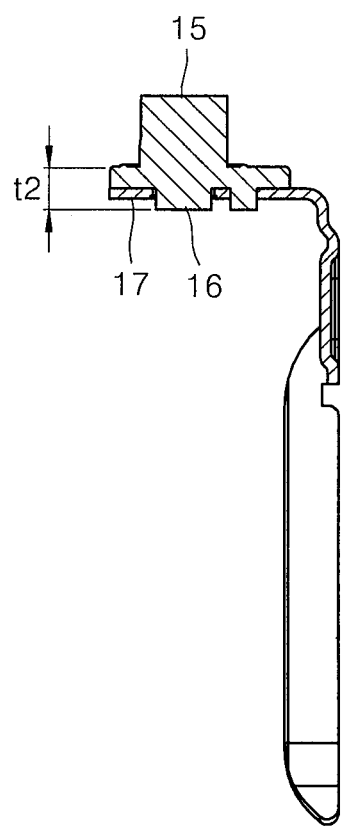
FIG. 6 is a cross-sectional view of the electrode unit taken along the line VI-VI of FIG. 5.

FIG. 5 is an exploded perspective view of an electrode unit 10 according to a comparative example. FIG. 6 is a cross-sectional view of the electrode unit 10 taken along the line VI-VI of FIG. 5. Referring to FIGS. 5 and 6, the electrode unit 10 includes a lead member 15 and a current collecting member 17 for electrically coupling the lead member 15 to an electrode assembly. The lead member 15 and the current collecting member 17 are coupled to each other by using a riveting or a caulking method.

In more detail, a coupling hole 17' may be formed in an upper end of the current collecting member 17 to be coupled to the lead member 15, and a rivet member 16 protruding downward from the lead member 15 may be inserted in the coupling hole 17'. In addition, a shaping tool (not shown) such as a hammer is located on a side of the lead member 15 and the current collecting member 17 that are arranged to overlap with each other and a die is located on the other side of the lead member 15 and the current collecting member 17, and after that, the lead member 15 and the current collecting member 17 are hit by the shaping tool so that the rivet member 16 may be compressed to a periphery of the coupling hole 17'. Then, the lead member 15 and the current collecting member 17 may be coupled to each other through the riveting or caulking process.

However, if the lead member 15 and the current collecting member 17 are coupled to each other through the riveting or caulking process, a thickness t2 (see FIG. 6) of the coupled portion of the lead member 15 and the current collecting member 17 may increase.

The thickness t2 of the coupled portion increases because a thickness of the rivet member 16 protruding from a lower surface of the current collecting member 17 is also added to the thickness of the lead member 15 and the current collecting member 17 that are to be coupled, according to the riveting or caulking process. Also, the thickness of the lead member 15 and the current collecting member 17 are entirely added, and thus, the thickness t2 of the coupled portion between the lead member 15 and the current collecting member 17 may also increase.

As described above, since the coupling through the riveting or the caulking process may increase the thickness t2 of the coupled portion, an internal volume of the case 180, for example, an effective internal volume in the case 180 may be reduced. For example, the thickness t2 of the coupled portion increases in a vertical direction of the case 180, and the number of windings of the electrode assembly 150 may be limited.

Referring to FIGS. 3 and 4, according to an example embodiment of the present invention, the lead member 115 and the current collecting member 117 that are to be coupled are formed to have matching shapes with each other, and the welding line W is formed along the boundary of the assembled structure, and accordingly, the thickness t1 may be reduced. For example, a stepped portion is formed between the base 115a and the assembling portion 115b and the assembling portion 115b is inserted in the accommodation hole 117' of the current collecting member 117, and thus, the thickness of the assembling portion 115b does not make the entire thickness t1 of the coupled portion increase. In addition, the base 115a that is relatively thin overlaps with the current collecting member 117, and thus, the thickness t1 of the coupled portion may be reduced.

Referring to FIG. 2, the internal volume in the case 180, in which the electrode assembly 150 is accommodated, is closely relevant to a battery capacity of the secondary battery. For example, the electrode assembly 150 may be formed as a roll type by interposing a separator between the first and second electrode plates having opposite polarities and winding a stacked body of the first and second electrode plates and the separator as a jelly-roll type. Here, the battery capacity of the electrode assembly 150 may vary depending on the internal volume of the case 180, in which the electrode assembly 150 is accommodated. For example, when the internal volume of the case 180 increases, the number of windings of the electrode assembly 150 may be increased. Accordingly, a facing area between the first and second electrode plates in the electrode assembly 150 may be increased, and thus, more electric charges may be stored.

According to example embodiments of the present invention, since the thickness t1 of the coupled portion is reduced, clearances increase in the vertical direction of the case 180 as much as the reduced thickness t1, and thus, an effective internal volume in the case 180 increases. Accordingly, the number of windings of the electrode assembly 150 may increase, and then, the battery capacity of the secondary battery may be increased.

In addition, the second electrode unit 120 may include the lead member 125 assembled on the cap plate 100 so as to penetrate through the cap plate 100, and a current collecting member 127 extending from the lead member 125 to the electrode assembly 150. Since the second electrode unit 120 may have substantially the same structure as the first electrode unit 110, for example, technical features of the first electrode unit 110 described with reference to FIGS. 2 through 4 may also be applied to the second electrode unit 120.

According to example embodiments of the present invention, the coupling structure of the electrode units that constitute the charging and discharging paths coupled to the electrode assembly may be improved, and accordingly, the effective internal volume in the case, in which the electrode assembly is accommodated, may be increased, and the battery capacity of the electrode assembly may be increased.

It should be understood that the example embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. A secondary battery comprising:
a case having an opening;
an electrode assembly in the case;
a cap plate configured to seal the opening of the case; and
an electrode unit penetrating through the cap plate, and electrically coupled to the electrode assembly,
wherein the electrode unit comprises:
a current collector coupled to the electrode assembly; and
a lead coupled to the current collector and penetrating through a terminal hole of the cap plate,
wherein the current collector and the lead are coupled to each other by inserting an assembling portion of the lead into an accommodation opening in the current collector, and, along an entire first length of the lead from a portion that is located within the accommodation opening to a portion penetrating through the terminal hole of the cap plate, a greatest width of the lead is at least as small as a greatest width of the accommodation opening such that the lead is insertable into the accommodation opening along the entire first length from a side of the current collector opposite the cap plate, and
wherein a welding curve is formed along a boundary between the assembling portion and the accommodation opening.

2. The secondary battery of claim 1, wherein the assembling portion is inserted from a lower direction of the accommodation opening.

3. A secondary battery comprising:
a case having an opening;
an electrode assembly in the case;
a cap plate configured to seal the opening of the case; and
an electrode unit penetrating through the cap plate, and electrically coupled to the electrode assembly,
wherein the electrode unit comprises:
a current collector coupled to the electrode assembly; and
a lead coupled to the current collector and penetrating through a terminal hole of the cap plate,
wherein the current collector and the lead are coupled to each other by inserting an assembling portion of the lead into an accommodation opening in the current collector, and, along an entire first length of the lead from a portion that is located within the accommodation opening to a portion penetrating through the terminal hole of the cap plate, a greatest width of the lead is at least as small as a greatest width of the accommodation opening such that the lead is insertable into the accommodation opening along the entire first length from a side of the current collector opposite the cap plate, and
wherein the lead further comprises a base expanding from the assembling portion to be stepped to a lower direction, and the base of the lead is located under a periphery of the accommodation opening to overlap with the periphery.

4. The secondary battery of claim 3, wherein the base contacts the periphery of the accommodation opening in a state where the assembling portion is inserted in the accommodation opening.

5. The secondary battery of claim 1, wherein the assembling portion of the lead and the accommodation opening of the current collector have shapes matched with each other.

6. The secondary battery of claim 5, wherein the assembling portion of the lead and the accommodation opening of the current collector have circular shapes.

7. The secondary battery of claim 6, wherein the welding curve is a circular welding curve.

8. The secondary battery of claim 1, wherein the lead comprises:
a base;
the assembling portion protruding upward from the base; and
a column portion protruding upward from the assembling portion so as to penetrate through the cap plate,
wherein the current collector comprises:
a current collecting portion coupled to the electrode assembly; and
an accommodation portion extending from the current collecting portion to define the accommodation opening.

9. The secondary battery of claim 8, wherein the base, the assembling portion, and the column portion form stepped portions with respect to each other so that the width of the lead decreases toward an upper portion.

10. The secondary battery of claim 8, wherein the base of the lead and the accommodation portion of the current collector overlap with each other.

11. The secondary battery of claim 10, wherein the base comprises a boundary formed along a periphery of the assembling portion, and the base further comprises a protruding piece extending from the boundary toward the accommodation portion.

12. The secondary battery of claim 8, wherein the accommodation portion of the current collector comprises an annular boundary for defining the accommodation opening.

13. The secondary battery of claim 8, wherein the accommodation portion and the current collecting portion of the current collector extend in different directions from each other, are coupled to each other, and are bent from each other.

14. A secondary battery comprising:
a case having an opening;
an electrode assembly in the case;
a cap plate configured to seal the opening of the case; and
an electrode unit penetrating through the cap plate and electrically coupled to the electrode assembly,
wherein the electrode unit comprises:
a current collector coupled to the electrode assembly; and
a lead coupled to the current collector and penetrating through the cap plate,
wherein the lead is inserted in an accommodation opening of the current collector to be assembled, a periphery of the accommodation opening being exposed at an upper side facing the cap plate, and a welding curve is formed at the exposed upper side of the periphery along a boundary between the accommodation opening and the lead.

15. The secondary battery of claim 14, wherein the lead comprises a base and an assembling portion protruding upward from the base, and the assembling portion of the lead is fitted into the accommodation opening of the current collector.

16. The secondary battery of claim 15, wherein the assembling portion and the accommodation opening have shapes that are matched with each other.

17. The secondary battery of claim 16, wherein the welding curve is formed along a circular curve through which the assembling portion and the accommodation opening are in contact with each other.

18. The secondary battery of claim 15, wherein the base is located under the periphery of the accommodation opening to overlap with the periphery.

19. The secondary battery of claim 18, wherein the current collector comprises:
an accommodation portion for defining the accommodation opening; and
a current collecting portion extending from the accommodation portion to be coupled to the electrode assembly,
wherein the accommodation portion and the current collecting portion extend in different directions from each other and are coupled to each other and are bent from each other, and the base comprises a boundary formed along a periphery of the assembling portion and a protruding piece extending from the boundary to overlap with the accommodation portion.

* * * * *